(12) United States Patent
Côté et al.

(10) Patent No.: US 7,343,082 B2
(45) Date of Patent: Mar. 11, 2008

(54) UNIVERSAL GUIDE TRACK

(75) Inventors: Jocelyne Côté, Longueuil (CA); Howard Ryshpan, Longueuil (CA)

(73) Assignee: Ryshco Media Inc., Montréal (CA)

( * ) Notice: Subject to any disclaimer, the term of this patent is extended or adjusted under 35 U.S.C. 154(b) by 1278 days.

(21) Appl. No.: 10/067,131

(22) Filed: Sep. 12, 2001

(65) Prior Publication Data
US 2003/0049015 A1    Mar. 13, 2003

(51) Int. Cl.
*H04N 5/93* (2006.01)
(52) U.S. Cl. .......................................... 386/54; 386/65
(58) Field of Classification Search .............. 386/46, 386/52, 54, 55, 65; 704/278
See application file for complete search history.

(56) References Cited

U.S. PATENT DOCUMENTS

| | | | |
|---|---|---|---|
| 4,774,666 A | 9/1988 | Miyao et al. | |
| 5,155,805 A | 10/1992 | Kaasila | |
| 5,159,668 A | 10/1992 | Kaasila | |
| 5,325,479 A | 6/1994 | Kaasila | |
| 5,388,197 A | 2/1995 | Rayner | |
| 5,434,678 A | 7/1995 | Abecassis | |
| 5,481,296 A | 1/1996 | Cragun et al. | |
| 5,612,872 A | 3/1997 | Fujita | |
| 5,717,468 A | 2/1998 | Baryla | |
| 5,732,184 A | 3/1998 | Chao et al. | |
| 5,832,171 A | 11/1998 | Heist | |
| 5,880,788 A | 3/1999 | Bregler | |
| 5,969,716 A | 10/1999 | Davis et al. | |
| 5,974,219 A | 10/1999 | Fujita et al. | |
| 6,047,252 A | 4/2000 | Kumano et al. | |
| 6,134,378 A | 10/2000 | Abe et al. | |
| 6,154,601 A | 11/2000 | Yaegashi et al. | |
| 6,185,538 B1* | 2/2001 | Schulz ..................... | 704/278 |
| 6,404,978 B1* | 6/2002 | Abe ......................... | 386/55 |
| 2001/0044724 A1* | 11/2001 | Hon et al. ................ | 704/260 |

FOREIGN PATENT DOCUMENTS

| | | |
|---|---|---|
| EP | 0 056 507 | 7/1982 |
| EP | 0 899 737 A2 | 3/1999 |
| EP | 0 902 431 A2 | 3/1999 |
| FR | 2 765 354 | 7/1999 |
| GB | 2 101 795 A | 1/1983 |
| JP | 11162152 | 6/1999 |
| WO | WO 97/15926 | 5/1997 |
| WO | WO 98/01860 | 1/1998 |
| WO | WO 98/06099 | 2/1998 |
| WO | WO 98/38642 | 9/1998 |

* cited by examiner

*Primary Examiner*—Huy Nguyen
(74) *Attorney, Agent, or Firm*—Ogilvy Renault, LLP (57) ABSTRACT

A method and apparatus is disclosed which provides an efficient tool for performing post-production synchronization of a video source. In the preferred embodiment, the graphemes of a detected audio source are synchronized with a script and are shown through a user interface. The user interface enables a user to perform the post-synchronization easily.

23 Claims, 8 Drawing Sheets

UNIVERSAL GUIDE TRACK

FIELD OF THE INVENTION

This invention pertains to the field of what is commonly referred in media production to as namely "post-production synchronization". More precisely, this invention provides a method and an apparatus for achieving post-production synchronization in video/film and multimedia, using a system of automated voice recognition.

BACKGROUND OF THE INVENTION

The system for post-synchronization that is used throughout most of the world is based on what is called a "beep-and-wipe" system. In a recording studio, the actor is given earphones, through which the dialog is fed.

An audible beep is sent as a signal to signify the beginning of the line to be re-recorded. A visual indicator, called a wipe, is superimposed on the screen as a visual indication of when to begin and stop. A series of takes are recorded, sometimes as many as 24, and are given to the editor in order to verify by eye or by trying to match the sound waves of the original production take with that of the newly recorded ones. Most of the editing is, in the end, totally dependant on the experienced eye and ear of the human operators. The method used for film dubbing in the greater part of the world is the same, except in the United States where the voice of the translator is fed into one of the earphones while the other carries the mixed track of dialog from the original language. The norm for the recording of dialog using this method is between ten to twelve lines of text per hour of studio time.

The system used in France, Quebec, and South Africa consists in taking the film that is to be post-synchronized (or dubbed) and transferring it to either a three quarter inch or a half inch video tape. The video is fed from a VCR to a special machine, called a detection machine, that links a roll of white 35 mm leader film with the VCR so that they run synchronously with each other. A detection of the scene cuts, and all the lip movements and dialog is then performed of the original language. A highly skilled craftsperson, called a detector, then proceeds to write with a pencil, on the strip of white leader. The detector copies the original language of the film dialog, following the precise movements of the lips and matches them to the spoken word. During this process, a particular emphasis is laid on a precise matching of the labials and semi-labials. A calligrapher then runs a strip of clear 35 mm leader on top, that is matched sprocket to sprocket with the original white strip underneath. The two rolls are then run simultaneously on a small geared table. After the rolls are locked, the calligrapher proceeds to copy the detection on the clear leader using a special pen and India ink. When this is completed, the calligraphied dialog is typed by a typist into a computer and copies of the text are printed for the director, the recording engineer, and the actors. The problems inherent with this system is that they are inefficient in their consumption of time and "man hours". Approximately 150 "man hours" are needed to complete all the operations for a "feature length film" (i.e. a film ranging from 90 to 100 minutes in running time). Since these operations are dependent upon a number of hands, they are open to errors and inaccuracies in the detection process and the calligraphy. After the recording sessions are completed, an editor works on the dialog tracks, adjusting the synchronization. When that is completed to everyone's satisfaction, a final mix of the tracks is done, and the script is re-conformed and is tabled for distribution.

The U.S. Pat. No. 5,732,184 teaches a system for the editing of video and audio sequences, and relates only to a system for editing video clips, or small portions of video, and sound clips based on short sections of sound waves displayed on a video screen. The cursor is able to display no more than three frames of video and sound at the same time in one direction or the other. The cursor then becomes an aid to identifying the material only.

Published GB Patent application GB2,101,795 relates to dubbing translation of soundtracks on film. This invention depends upon an ability to provide histograms, or a digital representation, of the sound amplitude. Somewhat difficult for the actors, as it is like asking them to learn a whole new alphabet. The invention also suggests that recorded material can be electronically shaped to fit the lip movement in order to produce a more natural speech. Unfortunately, it is known, in light of the current technology, that any reshaping that is not minimal will only distort the sound and will not therefore provide a natural sound. Each section, or loop of film, requires that it is manually operated by a trained user.

In the French patent publication 2,765,354, a system is disclosed and allows dubbing into French from other languages. This invention is also used to match the new French dialog to the images. Unfortunately, the system disclosed is slow and time consuming, as it is not automatic and requires manual input. It provides a maximum of 6 usable lines on a timeline. Furthermore, it also does not allow any modifications to be made since the dialog has already been permanently encrusted on the picture. It requires the performers to learn a whole new language of symbols different from the symbols normally used in the standard manual form of operation.

The international publication WO98/101860 provides a fairly simple device that attempts to use a computerized calligraphy of the dialogs. Its primary market is actually the home-entertainment or classroom games market. This device allows the player to substitute their voice for the one on the screen, using a basic recording device.

The "beep-and-wipe" system (in ADR, or Automatic Dialog Replacement) that is currently used throughout the world, is a system that is learned by performers, who then must develop a proficiency for it. Otherwise, it becomes rather tedious, frustrating, and time consuming. Actors must do it instinctively, i.e. they must learn to anticipate when to begin taking into account the fact that it takes the human brain $\frac{1}{20}^{th}$ of a second to decode what the eyes have seen and then, the time it takes for the actor to respond to what he or she has just seen would put the synchronization out approximately 1½ frames. The amount of text that can be said by the actor is limited in terms of time because it is based on the individual actor's retentive powers. The actor who begins his line late realizes it, and tries to catch up by the end of the sentence, making it very difficult to edit. This means that many takes have to be recorded, causing the editor to spend large quantities of time piecing together the final take. The time required by, not only the actor but by the director, the studio engineer, the editor, plus the cost of the studio itself will only create a greater expense of both time and money. An expense that could be avoided.

Spot editing is the editing in the studio by the studio engineer, who tries to match or tailor the waveforms of the original dialog with the newly recorded one. While some spot editing can be done in studio by trying to match waveforms, the drawbacks to this are that it requires some training and knowledge in the ability to read the waveforms so as to be able to properly match them, and also if there is too much variation in the tailoring of the waveforms, it will ultimately cause a distortion in the sound.

The human factor is very important in the current post-synchronization methods used around the world. Operators must be highly trained. Experienced operators are therefore needed as such methods rely on the capacity of the operators to interact and to react with the system, therefore the quality of the post-synchronization performed may vary from time to time. Furthermore these methods are very time consuming, and therefore are very costly.

Accordingly, there is a need for a method and apparatus that will overcome the above-mentioned drawbacks in post-synchronization.

SUMMARY OF THE INVENTION

It is an object of the invention to provide a method and apparatus for achieving post-production synchronization for film and video;

It is another object of the invention to provide a method and apparatus for achieving post-production synchronization for film and video that will enable an operator to anticipate the dialog.

Yet another object of the invention is to provide a method and apparatus for achieving post-production synchronization for film and video without repeatedly moving backward in time.

According to one aspect of the invention, there is provided a method for performing a post-production synchronization on a video source, the method comprising the steps of providing a sound source of the video source; providing the sound source to a voice recognition module; receiving basic units of recognized speech and time codes from the voice recognition module and processing the basic units of recognized speech and the time codes to provide an indication of the current temporal location of a post-production audio recording to be synchronized with the video source with respect to a script corresponding to the audio source using the basic units of recognized speech and the time codes.

According to another aspect of the invention, there is provided an editing tool for performing post-production synchronization on a video source, the video source comprising an audio source, the editing tool comprising a speech recognition associating unit collecting and associating basic units of recognized speech and related time codes received from a speech recognition module and a user interface providing an indication of the current temporal location of a post-production audio recording to be synchronized with the video source with respect to a script corresponding to the audio source using the basic units of recognized speech and related time codes from the speech recognition associating unit.

A "rythmo band" is a clear band of 35 mm which is written in India ink by a calligrapher and is projected in the recording studio by means of a specifically designed overhead projector and is run locked in synchronization with a projected image. The "rythmo band" comprises the script and the translated script in the case of film dubbing.

In the present description, the term "phoneme" is understood as defining an abstract unit of the phonetic system of a language. A phoneme corresponds to a speech sound (for example, the velar \k\ of cool and the palatal \k\ of keel), which can be perceived as a single distinctive sound in a word of a particular language. Phonemes once assemble together form a word. A phoneme may be graphically represented as a "grapheme", also known as a letter or a "digraph" of a writing system, such as letters and letter combinations, and which can be assembled together similarly to form a written word.

BRIEF DESCRIPTION OF THE DRAWINGS

The invention will be better understood by way of the following description of the preferred embodiment, together with the accompanying drawings, in which.

DETAILED DESCRIPTION

In the present application, the word "synchguide" will be introduced and will relate to an extended version of the concept of a "rythmo band".

Figure 1:
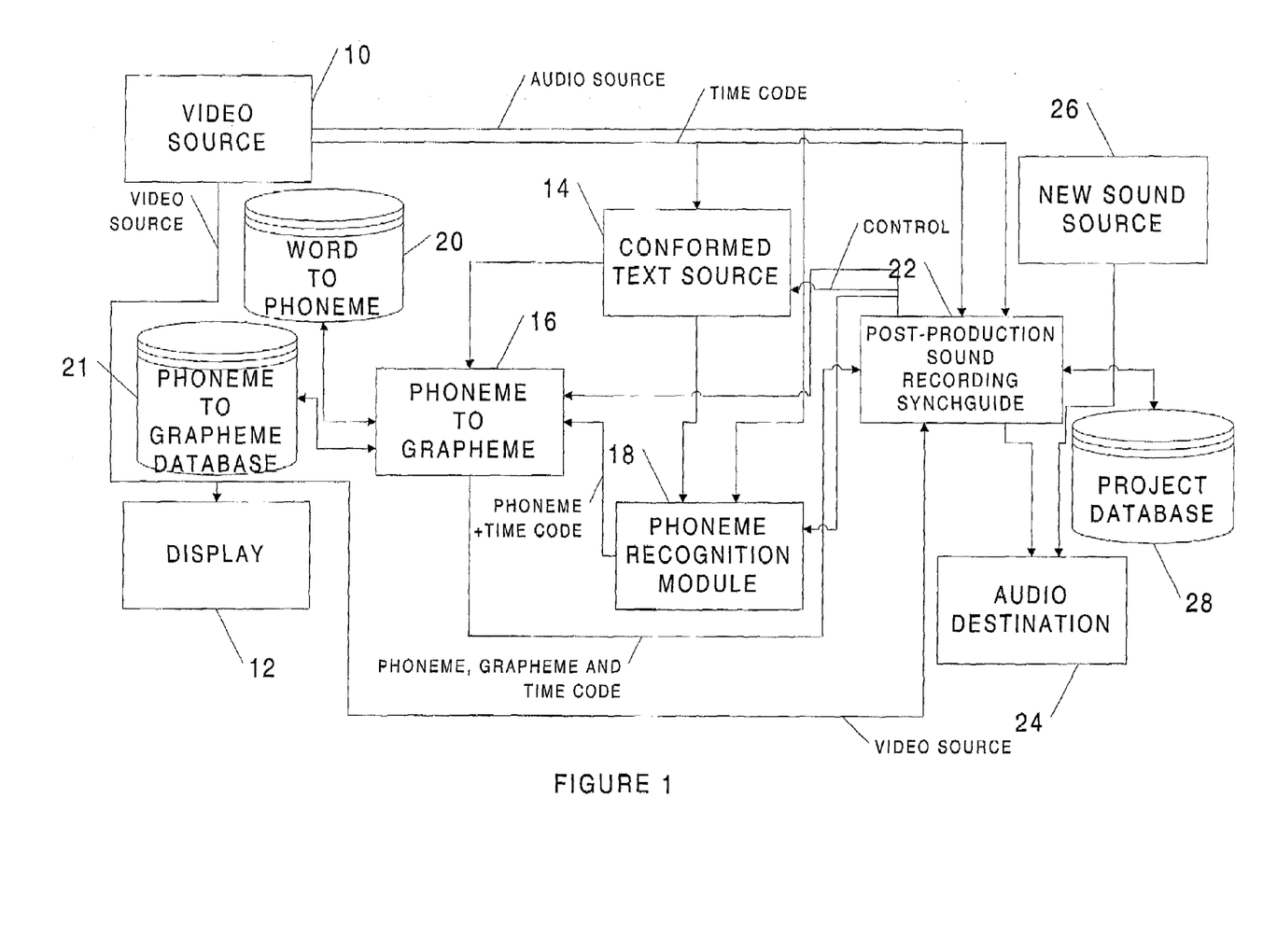
FIG. 1 is a block diagram of one embodiment of the invention; the apparatus comprises a video source, a conformed text source, a phoneme to grapheme unit, a phoneme recognition module, a post-production sound recording synchguide, a new sound source, a project database.

Now referring to FIG. 1, there is shown one embodiment of the invention; in this embodiment, the invention comprises a video source 10, a display 12, a conformed text source 14, a phoneme to grapheme unit 16, a phoneme recognition module 18, a word to phoneme database 20, a phoneme to grapheme database 21, a post-production sound recording synchguide 22, a video destination 24, a new sound source 26 and a project database 28.

The video source 10 provides a video stream to the display and to the post-production sound recording synchguide 22. The video source 10 also provides an audio source to the post-production sound editor 22 and to the phoneme recognition module 18. The video source 10 provides time codes to the conformed text source 14. In the preferred embodiment of the invention, the time codes provided have a common time origin.

The conformed text source 14 is controlled by the post-production sound recording synchguide 22. The conformed text source 14 provides conformed text and time codes to the phoneme recognition module 18 and to the phoneme to grapheme unit 16. The phoneme recognition module 18 is a standard voice recognition module that provides phonemes as well as time codes. Someone skilled in the Art of voice recognition will have sufficient information to select an appropriate phoneme recognition module.

The phoneme to grapheme unit 16 receives the phonemes and the time codes from the phoneme recognition module 18. The phoneme recognition module 18 is controlled by the post-production sound recording synchguide 22. In the preferred embodiment of the invention, each phoneme provided by phoneme recognition module 18 has two time codes. One of the two time codes is dedicated to the beginning of the phoneme, the other of the two time codes is dedicated to the end of the phoneme.

The phoneme to grapheme unit 16 provides at least the graphemes with the time codes to the post-production sound recording synchguide 22. Two time codes are dedicated for each grapheme in the preferred embodiment of the invention. The first time code of the two time codes is dedicated to the beginning of the grapheme, while the second time code of the two time codes is dedicated to the end of the grapheme.

The post-production sound recording synchguide 22 receives the graphemes with the time codes from the phoneme to grapheme unit 16, a new audio source from the new audio source 26 and provides the results to the audio destination 24, the post-production sound recording synchguide 22 is connected to the project database 28.

The phoneme to grapheme unit 16 is connected to the word to phoneme database 20 and to the phoneme to grapheme database 21.

The word to phoneme database 20 comprises a list of words with their corresponding phonemes.

The phoneme to grapheme database 21 comprises a list of words where the phonemes of each words are mapped to the corresponding graphemes.

The project database 28 comprises data about the project as explained below.

Figure 2:
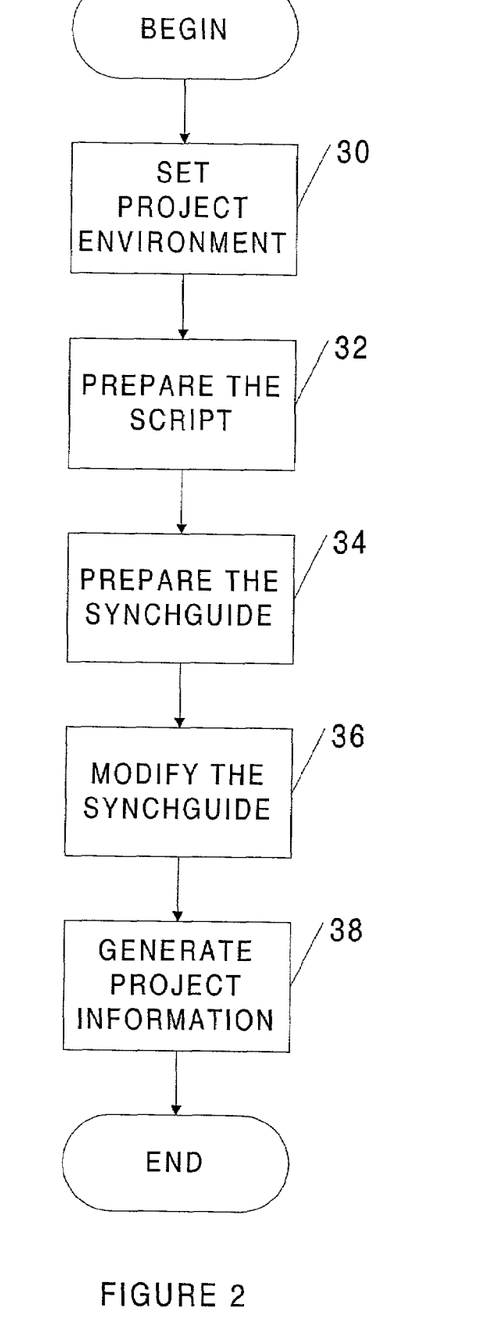
FIG. 2 is a flow chart of the preferred embodiment of the invention.

Now referring to FIG. 2, there is shown the preferred embodiment of the invention. According to step 30 of FIG. 2, the project environment is set. The script is then prepared according to step 32 of FIG. 2. The synchguide is prepared according to step 34 of FIG. 2. Then, according to step 36, the synchguide is modified. According to step 38, information related to the project is generated.

Figure 3:
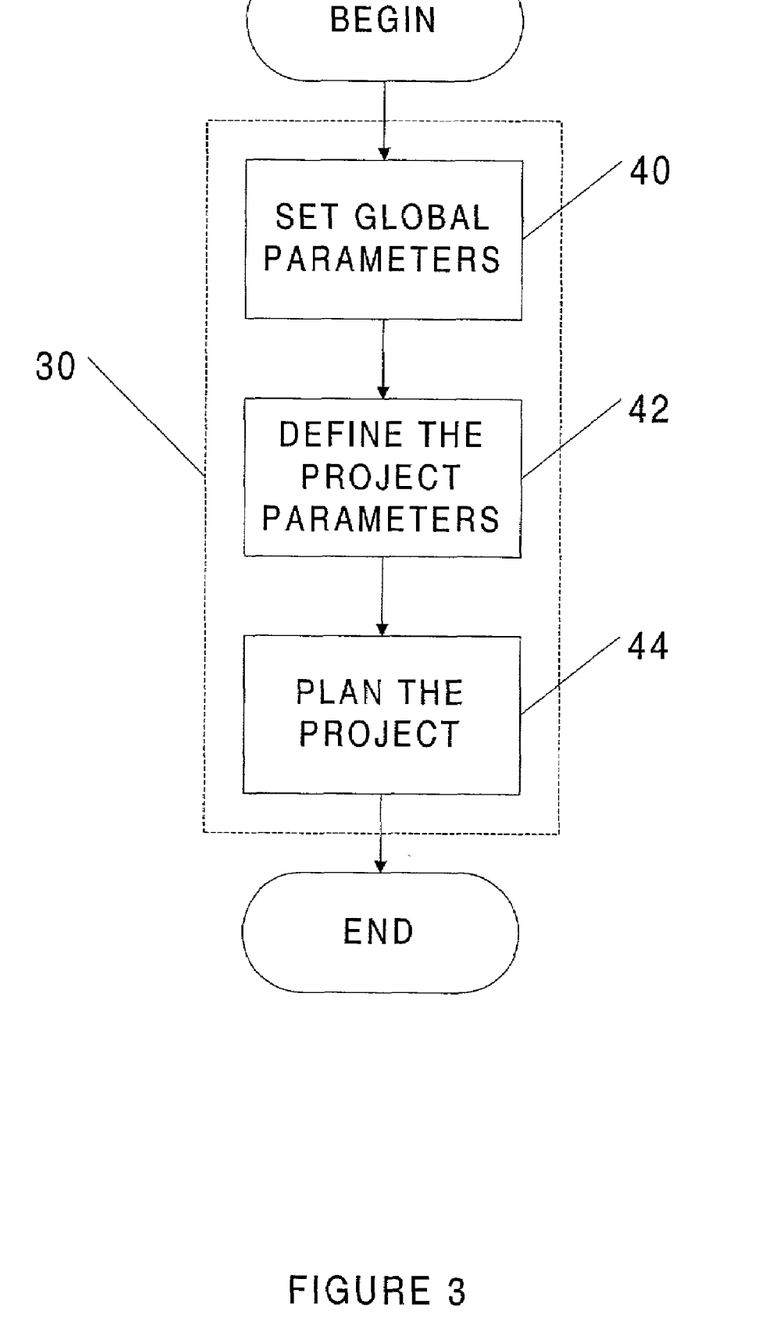
FIG. 3 is a flow chart which shows how the project environment is set.

Now referring to FIG. 3, there is shown how the project environment is setup. According to step 40, the global parameters for the project are entered. The global parameters comprise, but are not limited to, the name of the project, the type of project, the identity as well as the access login and password of the persons allowed to work on the project, etc.

According to step 42, the project parameters are entered. The project parameters comprise, and are not limited to, the name and the location of the video source, the name and the location of the audio source. In the preferred embodiment of the invention, the global parameters and the project parameters are provided to the post-production sound recording synchguide 22 and stored in the project database 28.

According to step 44, the project is planned. The step of planning the project comprises the step of assigning a time schedule to the persons allowed to work on the project.

Figure 4:
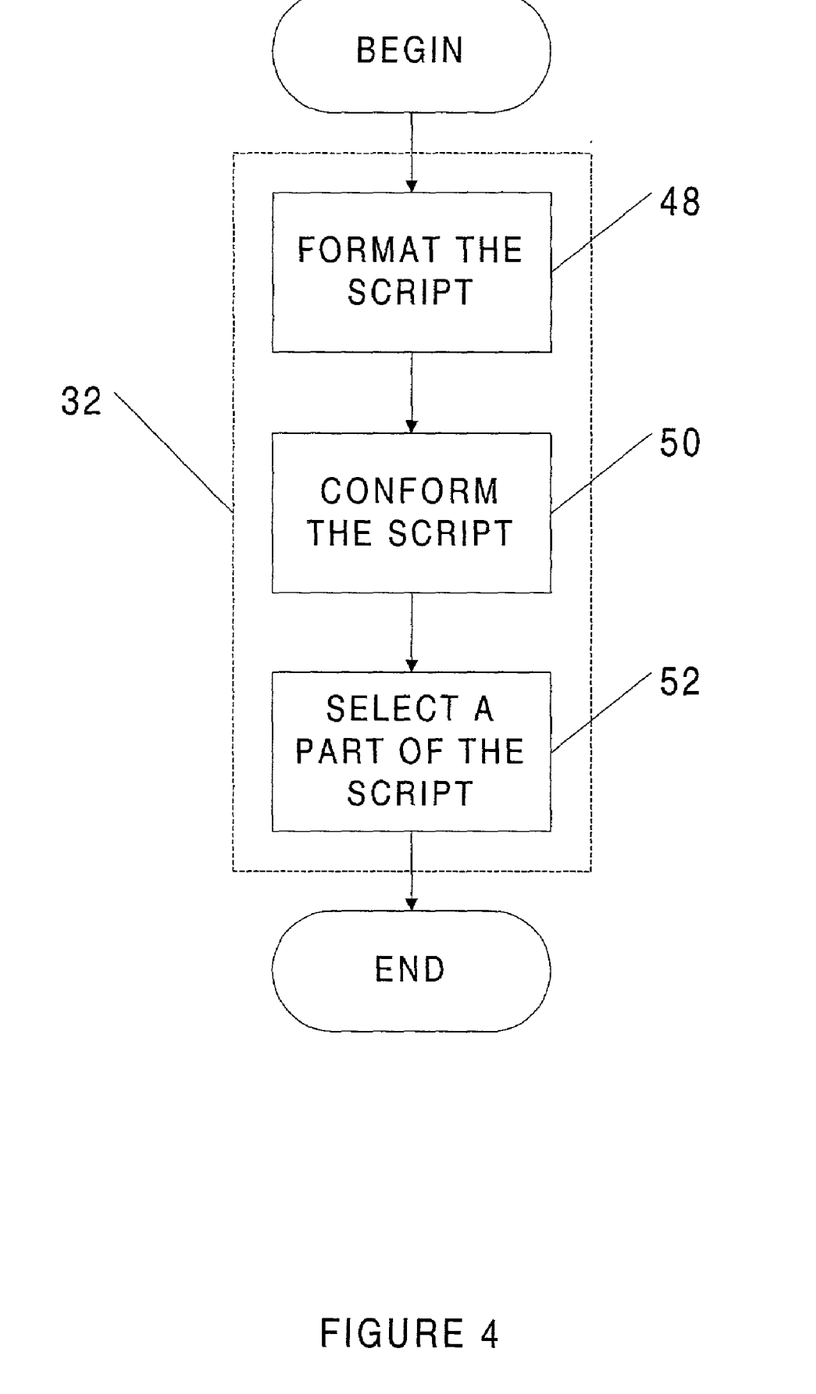
FIG. 4 is a flow chart which shows how the script is prepared.

Now referring to FIG. 4, there is shown how the script is prepared in the preferred embodiment of the invention. According to step 48, the script is formatted. According to step 50, the script is conformed. According to step 52, a part of the conformed script is selected. The part of the conformed script is selected from the conformed text source 14 using the control of the post-production sound recording synchguide 22.

Figure 5:
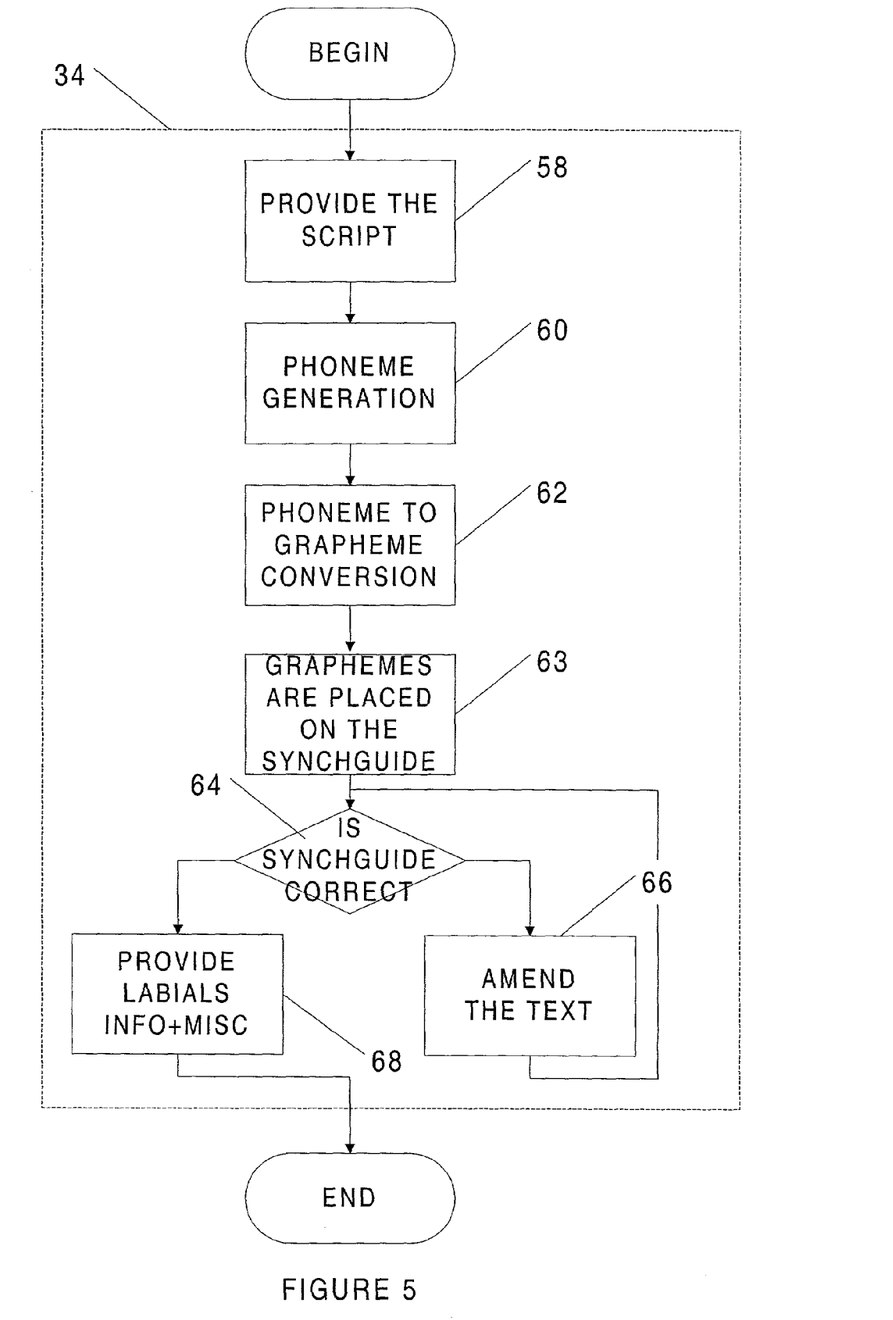
FIG. 5 is a flow chart which shows how the synchguide is prepared.

Now referring to FIG. 5, there is shown how the synchguide is prepared.

According to step 58, the script is provided to the phoneme recognition module 18. According to step 60, phonemes are generated by the phoneme recognition module 18 using at least the provided script and time codes. According to step 62, graphemes are generated using the phoneme to grapheme unit 16, the word to phoneme database 20 and the phoneme to grapheme database 21. In the preferred embodiment, graphemes are generated with their related time codes. More precisely, the phoneme to grapheme unit 16 receives a word from the conformed text source 14; the phonemes of the words provided by the conformed text source 14 are then found using the word to phoneme database 21. The phoneme to grapheme unit 16 also receives the phonemes as well as time codes from the phoneme recognition module 18. A match is then performed between the phonemes provided by the phoneme recognition module 18 and the phoneme found using the word to phoneme database 21. The phoneme to grapheme unit then provides then the graphemes using the phoneme to grapheme database 21, together with the word and the matched phonemes.

According to step 63, the graphemes are placed on the synchguide. In the preferred embodiment of the invention, the graphemes are placed on the synchguide using the post-production sound recording synchguide 22. The synchguide is displayed using the display 12.

According to step 64, a check is performed on the synchguide in order to confirm that the original synchguide is correct. If the synchguide is not correct, i.e. for instance small grammatical errors are detected, the text may be amended according to step 66. If the synchguide is correct and according to step 68, labials as well as other miscellaneous information is provided.

Figure 6:
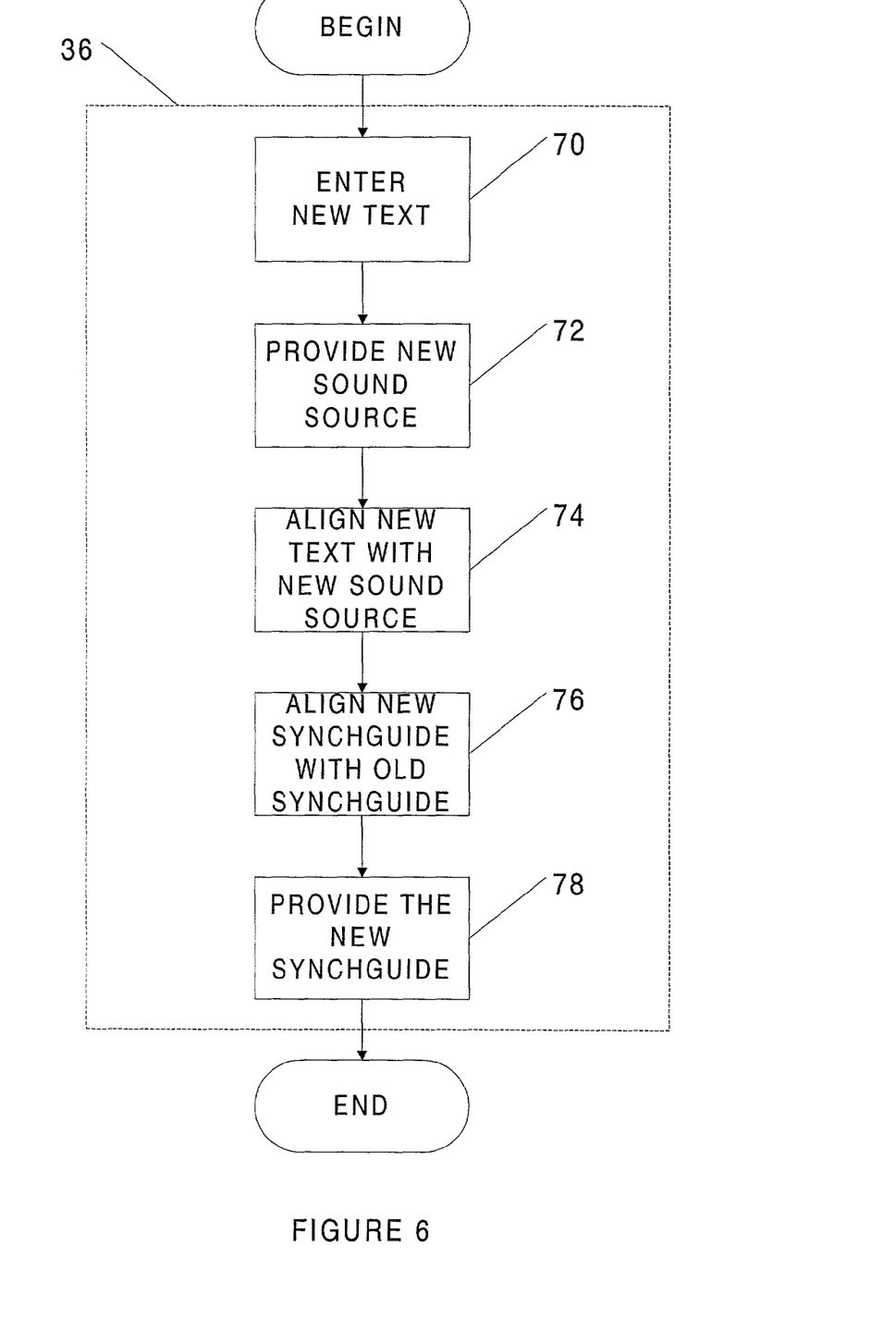
FIG. 6 is a flow chart which shows how the synchguide may be changed.

Now referring to FIG. 6, there is shown how the synchguide may be modified.

According to step 70, the user may provide a new text. The new text is provided to the conformed text source 14. According to step 72, a new sound source may be provided using the new sound source 26. According to step 74, the new sound source is aligned with the new text. This step is performed by generating the phonemes related to the new text source and their related time codes and then performing the phoneme to grapheme conversion using the phoneme to grapheme unit 16 together with the word to phoneme database 20 and the phoneme to grapheme database 21. Using the time codes generated by the phoneme to grapheme unit 16, the new sound source is aligned with the new text.

According to step 76, at least one part of the new synchguide is then aligned with the old synchguide. The alignment is performed in the preferred embodiment of the invention using the time codes.

In another embodiment of the invention, the new synchguide is saved in the project database 28.

According to step 78 of FIG. 6, the new synchguide is provided to the user.

In another embodiment of the invention, the persons allowed to work on the project may work via a remote location. The post-production sound recording synchguide 22 may be connected in this embodiment of the invention to a post-production sound recording synchguide server. Each allowed person may then access the post-production sound recording synchguide server remotely through a Local Area Network (LAN) or a Wide Area Network (WAN).

Figure 7:
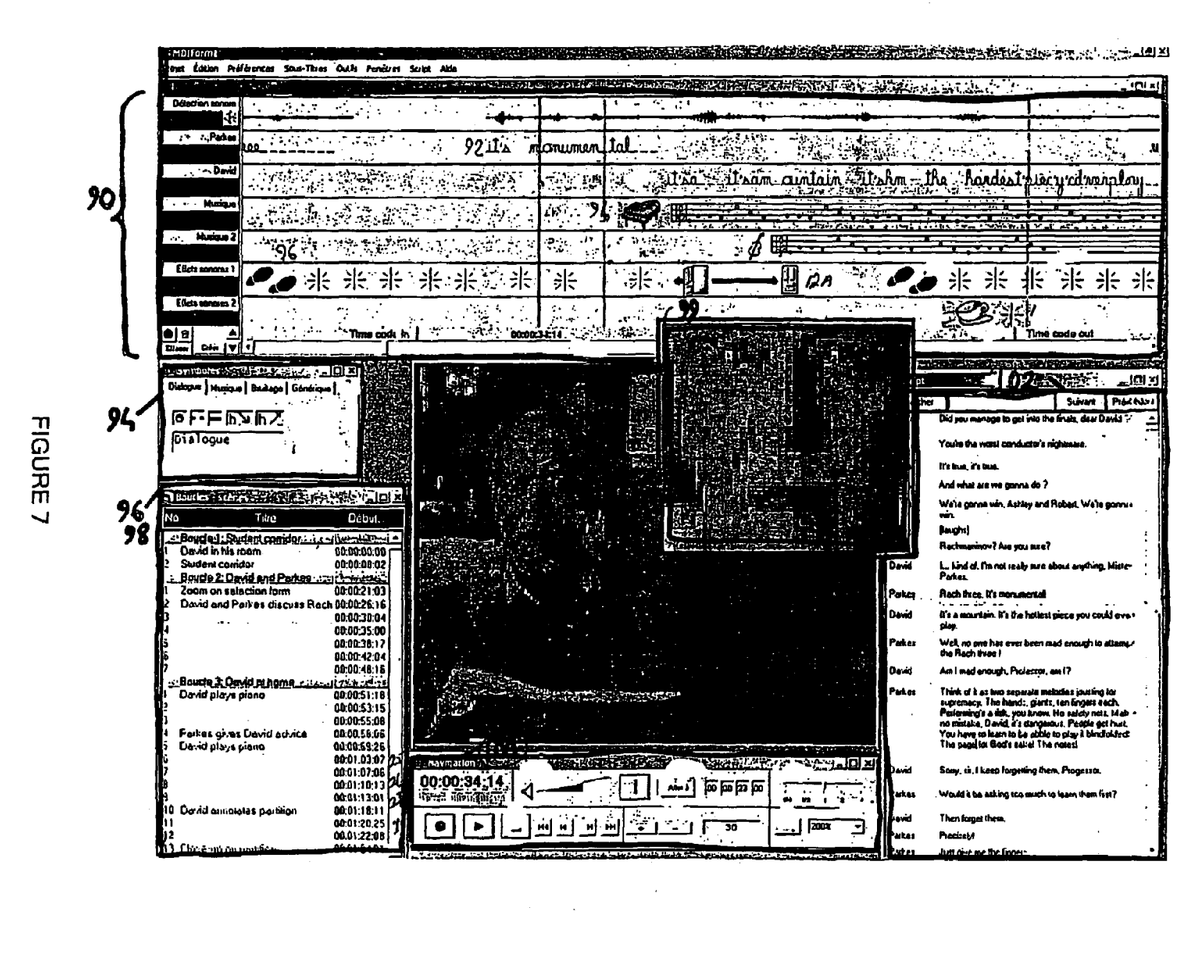
FIG. 7 is screenshot which shows the user interface in the preferred embodiment of the invention.

Now referring to FIG. 7, there is shown a screen shot of the user interface in the preferred embodiment of the invention.

In the preferred embodiment of the invention, the user interface comprises a menu, a guide track 90, a symbol menu 94, a loop/preview box 96, a zoom window 99, a navigation window 100 and a script window 102.

The guide track 90 enables the user to visualize the universal guide track. The universal guide track comprises a list of all the current actors on the scene as well as all the sound effects that are not performed by an actor.

In one embodiment of the invention, the identity of the actors is detected using the database of the project 28. For each actor the corresponding dialog is provided. The dialog is synchronized with time and displayed in a manner that allows an easy post-synchronization. In the preferred embodiment, the dialog is synchronized with time using the time codes provided with the graphemes.

In the preferred embodiment, the graphemes are placed with a letter length that corresponds to the phonemes length in order to provide an easy post-synchronization. The graphemes may be placed with a letter length that corresponds to the phonemes length using for instance a technology such as the "Truetype" technology. In another embodiment, different colors may be used to show the temporal properties of the graphemes. In the preferred embodiment, elements such as breaths, efforts, presence and exclamations are placed on the universal guide track using special expository symbols. In another embodiment, dedicated colors are used to present a special effect. In the preferred embodiment, Foleys are placed on a Foley track.

A moveable synchronizer bar enables the allowed users to view with precision the current position. A user may use the moveable synchronizer bar to move to a precise position.

The navigation window 100 enables a user to navigate through the different parts of the project. The navigation window 100 comprises a display that allows a user to find out his relative position. The navigation window 100 also comprises a display that allows a user to change the current scene. The navigation window 100 also provides a zoom in/out tool. The navigation window 100 also provides a tool that enables speed control and an indication of the frame reference.

The script windows 102 enables a user to have access to the conformed text. The text currently spoken on the screen is highlighted. A user may edit the text in the conformed text window.

The zoom window 99, allows a user to view the lip movements with a greater precision.

In a first alternative embodiment, the invention does not comprise the conformed text source 14. In this embodiment, the phoneme recognition module 18 may provide the phonemes with a great efficiency as the conformed text source is not available.

Figure 8:
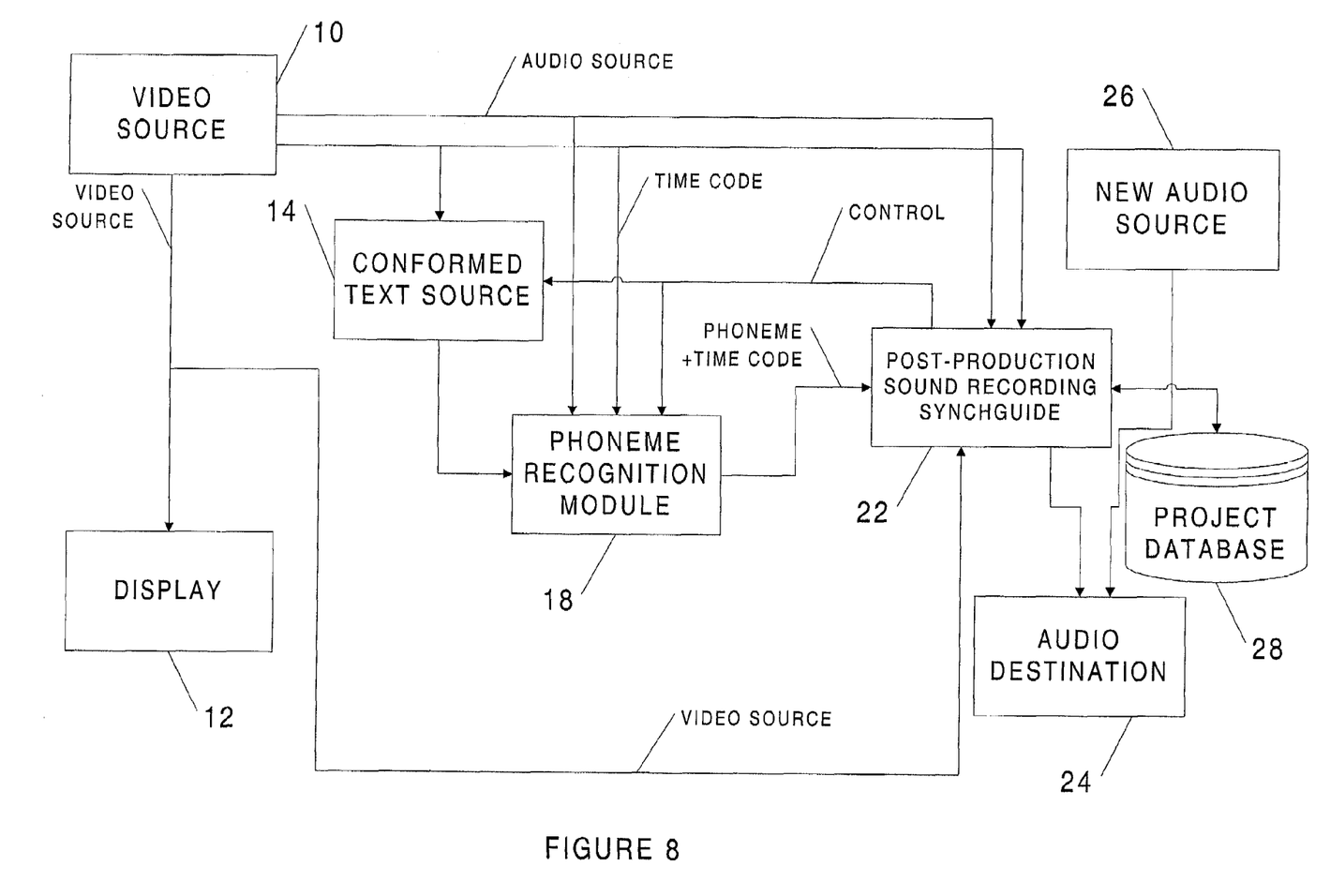
FIG. 8 is a block diagram of another embodiment of the invention; in this embodiment, the apparatus comprises a video source, a conformed text source, a phoneme recognition module; a post-production sound recording synchguide, a new sound source, a project database.

Now referring to FIG. 8, there is shown a second alternative embodiment. In this embodiment, the system comprises a video source 10, a display 12, a conformed text source 14, a phoneme recognition module 18, a post-production sound recording synchguide 22, an audio destination 24, a new sound source 26 and a project database 28.

The video source 10 provides an audio source to the phoneme recognition module 18 and to the post-production sound recording synchguide 22. The video source 10 further provides time codes to the conformed text source, to the phoneme recognition module 18 and to the post-production sound recording synchguide 22. The video source 10 provides the video source to the display 12 and to the post-production sound recording synchguide 22.

The conformed text source 14 provides the conformed text to the phoneme recognition module 18. In this embodiment, the phoneme recognition module 18 provides the phonemes with the related time codes to the post-production sound recording synchguide 22. The phoneme recognition module 18 and the conformed text source 14 are controlled by the post-production sound recording synchguide 22. The phoneme recognition module 18 is of the same type than the one described in the preferred embodiment of the invention.

In this embodiment, the post-production sound recording synchguide 22 provides the phonemes with their related time codes on the synchguide which is displayed by the display. More precisely, the post-production sound recording synchguide 22 provides a user interface where the phonemes are placed together with an indication of the current temporal location. The user has therefore an indication of when a sound begins and when a sound ends. It will be appreciated that this embodiment is simpler than the preferred embodiment but it greatly improves the prior art of "beep and wipe" systems. An alternative to this embodiment is to not include the conformed text source 14.

What is claimed is:

1. An editing tool for performing post-production synchronization on a video source, the video source comprising an audio source, the editing tool comprising:
   a speech recognition associating unit collecting and associating basic units of recognized speech and related time codes received from a speech recognition module, each of the basic units corresponding to a sound in a word and being related to at least one of the time codes; and
   a user interface providing an indication of the current temporal location of a post-production audio recording to be synchronized with the video source with respect to a script corresponding to the audio source using the associated basic units of recognized speech and the related time codes of each of the basic units from the speech recognition associating unit.

2. The editing tool for performing post-production synchronization on a video source as claimed in claim 1, wherein the basic units of recognized speech received from the speech recognition module are phonemes, the editing tool further comprising a converting unit, the converting unit converting the phonemes and the related time codes from the speech recognition module into words and related time codes; the user interface providing an indication of the current temporal location of the post-production audio recording with respect to a script corresponding to the audio source using the words and the related time codes.

3. The editing tool for performing post-production synchronization on a video source as claimed in claim 2, further comprising a phoneme to grapheme conversion module, converting the phonemes and the related time codes from the speech recognition module into graphemes and related time codes, the user interface providing an indication of the current temporal location of a post-production audio recording to be synchronized with the video source with respect to a script corresponding to the audio source using the graphemes and the related time codes received from the phoneme to grapheme conversion module.

4. The editing tool as claimed in claim 2, further comprising a word to phoneme database, providing a list of words and their corresponding phonemes, the word to phoneme database connected to the converting unit, the speech recognition module providing words and related time codes, the user interface enabling a synchronization of the words of the script with words detected in the post-production audio recording using the phoneme to word database, the phonemes and the related time codes.

5. The editing tool as claimed in claim 2, wherein the user interface enables a synchronization of the beginning and the end of each phrase of the script and the post-production audio recording using at least the phonemes and the related time codes.

6. The editing tool as claimed in claim 4, further comprising a conformed text source, providing the conformed text to the speech recognition module, the user interface synchronizing the words of the script with the words of the conformed text source using the phoneme to word database, the phonemes and the related time codes, and the conformed text source.

7. The editing tool as claimed in claim 3, further comprising a conformed text source connected to the phoneme to grapheme conversion module, the phoneme to grapheme conversion module providing graphemes and time codes using the conformed text, the user interface enabling a synchronization of the graphemes from the audio source with the script.

8. The editing tool as claimed in claim 1, wherein the time codes related to the script may be edited.

9. The editing tool as claimed in claim 1, further comprising an actor name generator; the speech recognition associating unit further receives a parameter indicative of the speaker from the speech recognition module, the parameter being associated with the name of an actor using the actor name generator; the user interface displaying the script according to the name of the actor.

10. The editing tool as claimed in claim 1, further comprising a database, storing data of the user interface, the data stored comprising the time codes associated with the script.

11. The editing tool as claimed in claim 8, further comprising a database, storing data of the user interface, the data stored comprising the time codes associated with the script.

12. The editing tool as claimed in claim 1, wherein the user interface comprises a navigation window enabling to change the current temporal location.

13. The editing tool as claimed in claim 1, wherein the user interface comprises a video window, the video window comprising the video source.

14. The editing tool as claimed in claim 9, wherein the script is displayed in different windows in the user interface according to the name of the actor.

15. The editing tool as claimed in claim 1, wherein the basic units of recognized speech are presented by the user interface with a visual indication of their temporal properties using their related time codes.

16. The editing tool as claimed in claim 15, wherein the visual indication of their temporal properties by the user interface comprises the use of colors, each color being associated with a range of temporal duration.

17. The editing tool as claimed in claim 15, wherein the visual indication of their temporal properties by the user interface comprises the use of extendable font.

18. A method for performing a post-production synchronization on a video source, the method comprising the steps of:

providing a sound source of the video source;

providing the sound source to a voice recognition module;

receiving basic units of recognized speech and time codes from the voice recognition module, each of the basic units corresponding to a sound in a word and being related to at least one of the time codes; and processing the basic units of recognized speech and the time codes to provide an indication of the current temporal location of a post-production audio recording to be synchronized with the video source with respect to a script corresponding to the audio source using the basic units of recognized speech and their related time codes.

19. The method as claimed in claim 18, further comprising the step of converting the basic units of recognized speech received with the time codes from the voice recognition module into words and related time codes, the words and the related time codes being processed to provide an indication of the current temporal location of a post-production audio recording to be synchronized.

20. The method as claimed in claim 18, further comprising the step of converting the basic units of recognized speech received with the time codes from the voice recognition module into graphemes and related time codes, the graphemes and the related time codes being processed to provide an indication of the current temporal location of a post-production audio recording to be synchronized.

21. The method as claimed in claim 18, wherein the basic units of recognized speech are phonemes.

22. The method as claimed in claim 18, further comprising the step of providing a conformed text source, the processing of the basic units of recognized speech and the time codes being performed using the basic units of recognized speech, the time codes and the conformed text source.

23. The method as claimed in claim 21, further comprising the step of amending at least one part of the sound source and the time codes using the detected graphemes with an indication of the current temporal location in the sound source of the video source.

\* \* \* \* \*